3,695,828
METHOD OF PURIFICATION OF EXHAUST GASES FROM NITRIC OXIDES

Petr Petrovich Gertsen and Taisia Georgievna Suverneva, Perm, U.S.S.R., assignors to Permsky Politekhnichesky Institut, Perm, U.S.S.R.
No Drawing. Filed Apr. 14, 1970, Ser. No. 28,523
Int. Cl. B01d 53/34
U.S. Cl. 423—239                      7 Claims

ABSTRACT OF THE DISCLOSURE

A method of purification of exhaust gases from nitric oxides wherein the exhaust gases are subjected to sorption with an alkaline reagent for removing higher oxides, then the gas is contacted with pyrite $FeS_2$ sprayed with water, in which case the basic portion of the nitric oxide is reduced to elementary nitrogen, after which the purified gas with residual nitric oxide is contacted with carbon monoxide so that the residual nitric oxide is reduced to elementary nitrogen.

---

The present invention relates to those branches of chemical industry which are associated with formation of gases containing nitric oxides. More specifically the invention relates to methods of purification of exhaust or industrial waste gases from nitric oxides.

The above-said gases are formed in the process of production of weak and concentrated nitric acid, of sulphuric acid by the nitrous method, of various nitro compounds including semi-finished products for dyestuffs and explosives. The purification of these gases to a required standard is still a significant problem lacking a satisfactory solution.

Various methods of purification of such waste gases from nitric oxides have been proposed and are partially used in industry.

Anhydride nitric oxides ($N_2O$, $NO_2$, $N_2O_4$, $N_2O_5$) are removed from the gases comparatively easily by means of absorption by alkaline reagents (cf. French Pat. No. 1,387,207 of July 16, 1963).

The most difficult operation of the process of purification consists in binding nitric oxides which are substantially insoluble in water and which do not interact with alkalines and acids.

Most of the sorption methods of binding nitric oxides are based on utilization of the reducing power of nitric oxides. According to these methods nitric oxide is oxidized by any oxidizer to nitric dioxide which is then absorbed by means of alkaline reagents. The oxidizers may be composed of nitric acid, a mixture of nitric acid with magnesium dioxide, ozone, air oxygen obtained during the irradiation of a gas mixture with ultraviolet light. The oxidation of nitric oxide followed by the absorption of the products is advantageous in that nitric oxide is utilized completely, without waste products. The disadvantages of this method of oxidation of nitric oxide consist in poor efficiency of binding nitric oxide when employing inexpensive oxidizers and in a high cost of the method when using strong oxidizers for high purification of gases. For these reasons investigators consider the oxidizing and absorption methods of purification of industrial waste gases from nitric oxides to a content of 0.02 to 0.01% practically unsuitable due to the high cost of the process.

At present, more emphasis is placed on methods based on the utilization of the oxidizing properties of nitric acid: it is used for catalytic or thermal oxidation of various combustible materials, in which case the oxygen of the nitric oxide oxidizes the combustible components, while nitrogen is isolated in an elementary state.

The process of catalytic decomposition of nitric oxide is effected at a temperature of 250–700° C. and at a higher pressure of the gases (1 to 6 atm.) by using a combustible gas. Palladium and platinated nickel are used as a catalyst. The presence of oxygen in the gases impedes the process. If the content of oxygen exceeds 5%, it is necessary to use a two-stage combustion of the gases with their intermediate cooling after the first combustion stage.

The method of decomposition of nitric oxide to elementary nitrogen is advantageous in a comparatively high efficiency and absence of waste products which would require further treatment. The disadvantages of the catalytic method of decomposition of nitric oxide consist in a relatively high consumption of a very expensive catalyst (palladium, platinum), high consumption of a reducing gaseous agent, the necessity of heating all the gas being purified to a temperature of 250–700° C., high consumption of energy and also in difficulties associated with construction of apparatus for compressing large volumes of corrosion-aggressive gases to a pressure of 6 atm.

In order to eliminate the losses of the catalyst it was proposed to effect thermal decomposition of nitrogen at 1500–2300° C. without a catalyst. However in this case it is necessary to heat up the gases containing nitric oxide to the above-stated temperature.

The combustible compounds binding oxygen from nitric oxide during the reduction thereof at a high temperature are preferably natural gas, gases containing hydrogen and carbon monoxide, or an incandescent layer of a carbonaceous material.

Lately, there were proposed other methods of purification of waste gases from nitric oxides, for example, with the help of freshly precipitated iron sulphide applied onto a carrier or with the help of anion-exchange resins.

The sulphide method is disadvantageous in that it necessitates the frequent preparation of freshly precipitated iron sulphide, and in difficulties associated with applying sulphide on a carrier and replacement of the carrier after working of the sorbent.

The anion-exchange method is expensive due to the high cost of organic anion-exchange resins.

An object of the invention is to provide a method of purification of industrial waste gases from nitric oxides which ensures cleaning of the gases to a content of nitric oxides therein not higher than 0.02–0.05 vol. percent, and in which an exhaust means is allowed for removing the gases into the atmosphere.

Another object of the invention is to provide a simple and inexpensive method which does not require application of expensive catalysts and high consumption of energy in the process of purification.

Still another object of the invention is to provide a cheap and easily obtainable deoxidizer for decomposition of nitric oxide.

These and other objects are attained by providing a method of purification of industrial waste gases from nitric oxides by means of absorption of the starting gas with an alkaline reagent for removing the higher nitric oxides $N_2O_3$, $NO_2$, $N_2O_4$, and $N_2O_5$. The alkaline reagent may be composed of the following compounds: soda, sodium hydrate, caustic potash, caustic lime (CaO), ammonia. These compounds are preferably used in the form of aqueous solutions. The most preferable is lime milk because it is the cheapest and most readily available material as compared with the other reagents and the sorption products can be processed into nitrocalcite.

According to the invention, gas released from the above-mentioned higher nitric oxides is contacted with pyrite ($FeS_2$). This contact is so effected that the said gas is fed through a pyrite layer downwardly from above, the rate of feeding the gas being such that not more than 0.25 mole of nitric oxide per hour is fed onto 1 m.² of the surface of the pyrite particles. The height of the pyrite layer is a rated value and is determined depending on the above-said limited quantity of nitric oxide fed onto 1 m.² of the pyrite surface.

It is expedient to use pyrite with the size of the particles at least 2 mm. so that the resistance of the layer to infusion of the gas is low (not higher than 100 mm. water column). The particles sized from 3 to 10 mm. are most preferable. The use of pyrite particles with a size greater than 10 mm. results in a reduction of the specific contact surface.

In the process of contact of the gas with the pyrite the main portion (70–80%) of the nitric oxide is reduced to elementary nitrogen by the following summary equation:

$$30NO + 4FeS_2 + 2H_2O \rightarrow 15N_2 + 2Fe_2(SO_4)_3 + 2H_2SO_4$$

In the process of contact of the gas with the pyrite, the pyrite layer is watered for removing the pyrite oxidation products, i.e., iron sulphate and sulphuric acid, from the surface of the pyrite particles. In addition, water assists in acceleration of the above-mentioned reaction.

The watering of the pyrite is preferably conducted by feeding water in the amount of 0.3–6 litre per mole of nitric oxide in the gas being purified, the most expedient amount being 1.3 to 3 litres. The watering with an amount of water of less than 0.3 litre per mole of NO does not provide for removing the reaction products from the pyrite surface, and therefore the process is slowed down. When using water in an amount exceeding 6 litres per mole of NO a liquid film is formed on the pyrite surface which prevents the gas from contact with the pyrite.

After removing the basic portion of the nitric oxide during the contact with the pyrite, the purified gas with the remaining nitric oxide is mixed with a gas containing carbon monoxide in an amount providing for recovery of the nitric oxide to elementary nitrogen according to the equation:

$$2NO + 2CO \rightarrow 2CO_2 + N_2$$

Usually this quantity of carbon monoxide is equal to 1.15–1.25 mole per mole of the nitric oxide remaining in the gases being purified.

The gases containing carbon monoxide and used in this process may be composed of industrial gases, for example, water gas, generator gas, or lighting gas. In the present invention generator gas is preferable as the most readily obtainable and least expensive.

The time of contact of the gas being purified with the carbon monoxide is preferably maintained within 10–15 sec. for providing for completeness of the process.

The proposed method of purification is effected at all stages at generally the temperature ambient of the starting gas supplied for purification, i.e., neither heating of the gas nor its cooling is required.

The proposed method makes it possible to purify the gases to a residual content of nitric oxides therein equal to 0.02 to 0.05%.

The method according to the invention is practically effected as follows.

The waste gas to be purified from nitric oxides is forced through a scrubber or another mass-exchange apparatus sprayed with an alkaline absorber, for example, lime milk. The higher nitric oxides are removed from the gases and form with the alkaline reagent a solution of nitrites and nitrates which are suitable for further processing, for example, into fertilizers.

The gas to be purified containing nitric oxide is directed to a contact apparatus containing pyrite in the form of particles of 3 to 10 mm. in diameter. In this apparatus the gas passes through the watered pyrite layer downwardly. The pyrite is watered by feeding water in the amount of 0.3 to 6 litres per mole of the nitric oxide, preferably within the range of 1.3 to 3 litres.

The rate of the gas passed through the pyrite layer should be such that the amount of the nitric oxide applied onto 1 m.² of the surface of the pyrite particles does not exceed 0.25 mole per hour. Chemisorption of the nitric oxide by the pyrite takes place on the surface of the pyrite particles followed by the formation of products of oxidation of the pyrite, i.e. iron sulphate and sulphuric acid which are washed out with water. The elementary nitrogen formed due to the reduction of the nitric oxide escapes together with the gas flow. The gas flow leaving the zone of contact is mixed with a gas containing carbon monoxide, for example generator gas. The addition of the generator gas into the gas flow is effected either in a separate device or in the gas duct.

After 10–15 seconds of contact of the gases with carbon monoxide, nitric oxide is reduced with carbon monoxide, in which case there are formed elementary nitrogen and carbon dioxide. Both components together with the gas flow are exhausted into the atmosphere.

As seen from the above description, the proposed invention features a number of advantages.

The basic advantage consists in a considerable simplification of the technology despite the fact that three mass-exchange apparatus are required, one of which is used for absorption of higher nitric oxides, the second being used for contact of the gases with pyrite and the third being employed for the contact of the gases with carbon monoxide (if this contact is not effected in the gas duct). In this case the heating and compression of the gases being purified are not necessary and there is no need for a catalyst. Thus, processes are obviated which require high consumption of thermal and electric energy and application of complicated process equipment. Considerable reduction of the operational costs is also attained due to the use of an inexpensive natural reducer, i.e., pyrite, for reducing the basic portion of nitric oxide (70–80%). The presence of oxygen in the gases does not hinder the conduction of the process, because the oxygen does not react with the watered pyrite and with the carbon monoxide at the temperature of conduction of the process.

Following is a description by way of example of the method of carrying the invention into effect.

A gas flow in the amount of 7900 cu.m. per hour with a content of NO equal to 3.84 g./m.³ and $NO_2$ equal to 3.16 g./m.³ was washed in an adapter scrubber having a diameter of 1.75 m. and a height of 6 m. sprayed with lime milk.

After the absorption of the starting gas with the lime milk, the content of nitric oxide therein is the same, i.e., 3.84 g./m.³, while the content of $NO_2$ is reduced to 0.316 g./m.³.

The gases leaving the scrubber are directed to a multi-stage contact apparatus with a total surface area of the grates supporting the pyrite layer equal to 220 m.². The height of the pyrite layer is 23 cm., the diameter of the pyrite particles is within 3–10 mm. The gases are forced through the pyrite layer in the direction from the top to the bottom at a rate of 0.1 m./sec., which corresponds to 0.25 mole of nitric oxide per sq. m. of the pyrite surface. The pyrite layer is sprayed with water in the amount of 0.3 to 0.5 litre per cu.m. of the gases being purified, and this corresponds to the spraying standard evaluated for 1 mole of nitric oxide. In this case the residues of $NO_2$ and 72 vol. percent of nitric oxide NO are removed from the gases. The residual content of the nitric oxide on the gas after contact with the pyrite amounts to 1.07 g./m.³.

When spraying the pyrite with water, the products of its oxidation, i.e., iron sulphate and sulphuric acid, are removed from the surface of the pyrite particles.

The acidic sewage leaving the apparatus for contacting nitric oxide with pyrite is substantially neutralized with lime to pH=9.

Added to the gas flow in the amount of 79,000 m.³/hour after the contact with the pyrite having 1.07 g./m.³ of NO and moving through the gas duct is 315 m.³/hour of generator gas containing 25% of carbon monoxide. After the contact of the gases (NO and CO) during 10 sec., the content of nitric oxide is reduced to 0.2 g./m.$^3$ (0.02%).

Such a gas is allowed to exhaust into the atmosphere.

We claim:

1. A method of purifying industrial waste gases containing NO, $N_2O_3$, $NO_2$, $N_2O_4$ and $N_2O_5$ which comprises removing by absorption the higher oxides $N_2O_3$, $NO_2$, $N_2O_4$ and $N_2O_5$ by contacting said gas with an aqueous alkaline solution; passing the resultant treated gas containing NO downwardly through a layer of pyrite ($FeS_2$) in the presence of water whereby a portion of the NO is reduced to elemental nitrogen, the said resultant treated gas being contacted with the pyrite at a rate of not more than 0.25 mole of NO per hour per square meter of pyrite, and thereafter contacting said gas containing a residual amount of NO with a gas containing carbon monoxide for a period of 10 to 15 seconds whereby the residual NO is reduced to elemental nitrogen, all said steps being carried out at generally the ambient temperature of the waste gas.

2. A method as claimed in claim 1, in which the aqueous alkaline solution is composed of lime milk.

3. A method as claimed in claim 1, in which pyrite is used in the form of particles having a diameter at least 2 mm.

4. A method as claimed in claim 3, in which pyrite is used in the form of particles having a diameter within 3 to 10 mm.

5. A method as claimed in claim 1, in which the pyrite is sprayed by water in the amount of 0.3–6 litres per mole of nitric oxide in the gas being purified.

6. A method as claimed in claim 5, in which the pyrite is sprayed by water in the amount of 1.3–3 litres per mole of nitric oxide.

7. A method as claimed in claim 1, in which the gas containing carbon monoxide is a generator gas.

References Cited
UNITED STATES PATENTS

| | | | |
|---|---|---|---|
| 3,348,914 | 10/1967 | Quanquin et al. | 23—161 |
| 1,752,086 | 3/1930 | Hirtz | 23—161 |
| 3,398,101 | 8/1968 | Baker et al. | 23—2 E |

EARL C. THOMAS, Primary Examiner

U.S. Cl. X.R.

423—235, 351